UNITED STATES PATENT OFFICE.

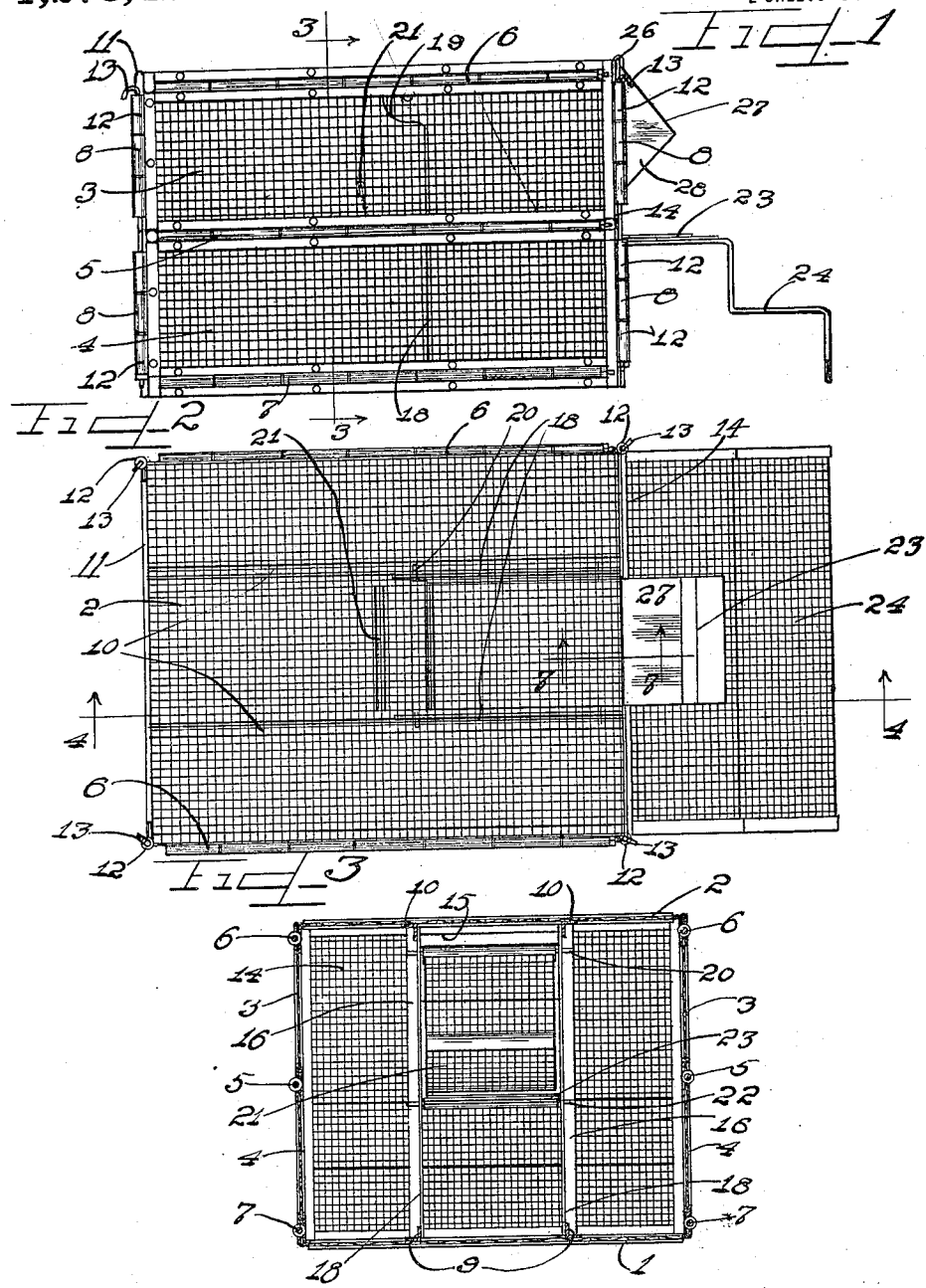

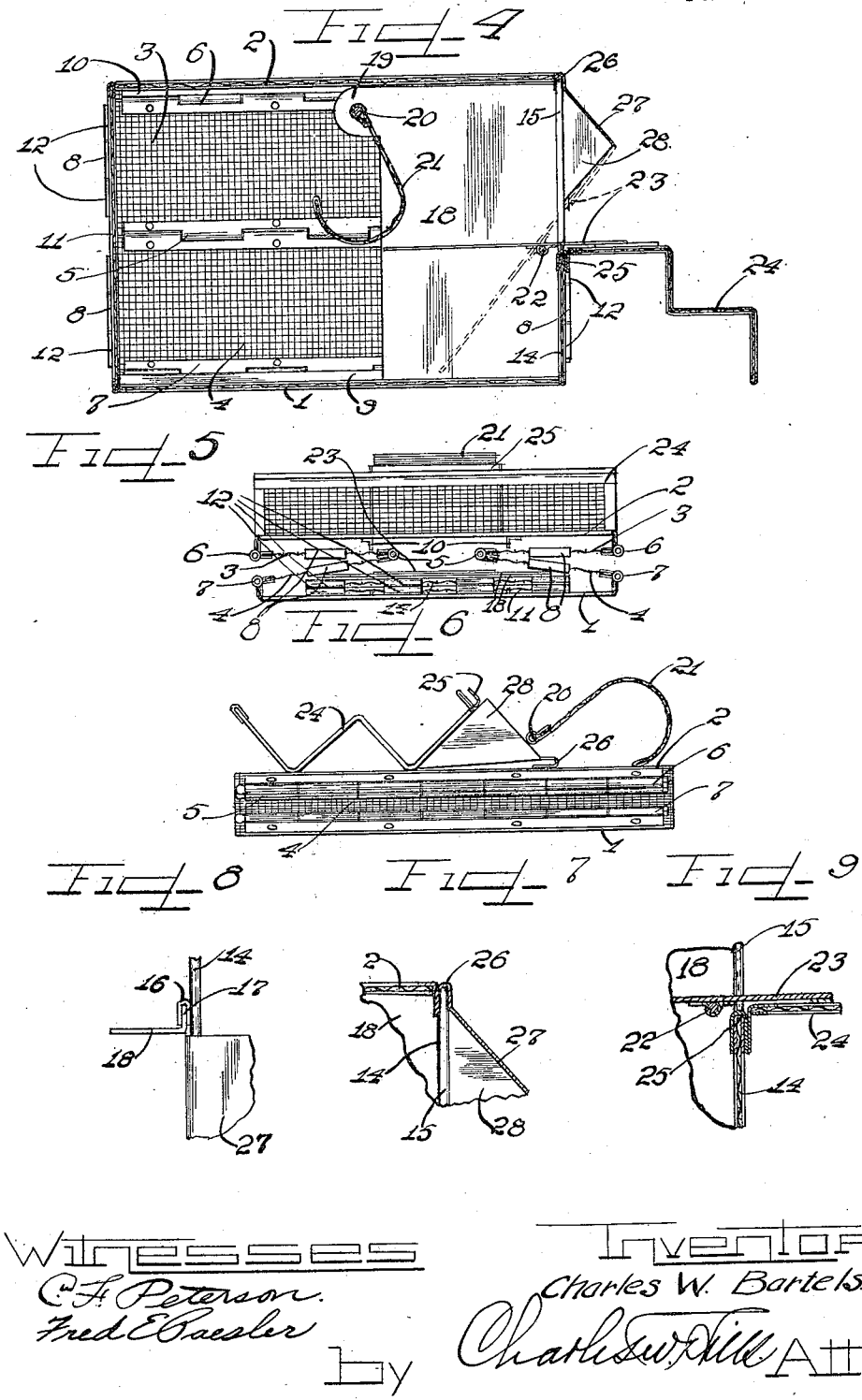

CHARLES W. BARTELS, OF CHICAGO, ILLINOIS.

COLLAPSIBLE RAT-TRAP.

1,278,421.  Specification of Letters Patent.  Patented Sept. 10, 1918.

Application filed April 12, 1918. Serial No. 228,115.

*To all whom it may concern:*

Be it known that I, CHARLES W. BARTELS, a citizen of the United States, and a resident of the city of Chicago, in the county of Cook and State of Illinois, have invented certain new and useful Improvements in Collapsible Rat-Traps, and I do hereby declare that the following is a full, clear, and exact description of the same, reference being had to the accompanying drawings, and to the numerals of reference marked thereon, which form a part of this specification.

This invention relates to an improved form of a collapsible rat trap, wherein a plurality of parts are removably connected with a body portion or casing provided with collapsible sides which are hingedly connected to top and bottom members to permit the casing to be collapsed when the removable parts are detached, so that the entire trap may be conveniently packed in collapsed form into a small space or within a box when not in use.

It is an object of this invention to construct a collapsible rat trap.

It is also an object of the invention to provide a rat trap adapted when not in use to be readily collapsed and stored in a small space.

Another object of the invention is the construction of a collapsible rat trap provided with a removable front and back adapted when in position to hold a collapsible cage braced against collapsing.

A further object of the invention is the construction of a rat trap embracing a plurality of interfitting parts arranged to be readily disengaged from one another to permit the trap to be packed in a small space.

It is furthermore an object of this invention to construct a collapsible trap wherein a bait support is pivotally mounted between smooth partition walls above the inner end of a trap door the outer end of which is adapted to be swung upwardly to close the trap entrance when the trap door is operated to admit an animal into the trap.

It is an important object of the invention to construct a trap wherein the front and back may be removably mounted at either of the open ends of a collapsible cage portion.

Another important object of the invention is to provide a trap wherein removable partition walls for pivotally supporting a trap door and a bait support, also serve to brace a collapsible cage.

It is a further important object of this invention to provide a collapsible animal trap of simple and effective construction wherein the trap entrance is simultaneously closed as an animal is admitted into the trap.

Other and further important objects of this invention will be apparent from the disclosures in the specification and drawings.

The invention (in a preferred form) is illustrated in the drawings and hereinafter more fully described.

On the drawings:

Figure 1 is a side elevation of a collapsible rat trap embracing the principles of this invention.

Fig. 2 is a top plan view thereof.

Fig. 3 is a section taken on line 3—3, of Fig. 1.

Fig. 4 is a sectional view taken on line 4—4, of Fig. 2.

Fig. 5 is an end view of the rat trap in collapsed position.

Fig. 6 is a side elevation thereof.

Fig. 7 is an enlarged fragmentary detail section taken on line 7—7, of Fig. 2.

Fig. 8 is a top view thereof with the top of the trap omitted.

Fig. 9 is an enlarged fragmentary detail section showing the means for removably attaching the stairs to the front wall of the trap.

As shown on the drawings:

The collapsible rat or animal trap comprises a collapsible box, casing or cage open at both ends and embracing a screen bottom 1, a screen top 2, and collapsible sides each comprising an upper screen side or wall 3 and a lower screen side or wall 4. The adjacent margins of the upper and lower side walls 3 and 4 are pivotally connected together by means of hinges 5. The upper margins of the upper side walls 3, are pivotally connected to the side edges of the top 2, by means of upper hinges 6, and the side edges of the bottom 1, have the lower margins of the lower side walls 4, pivotally connected thereto by lower hinges 7. Formed centrally on each end of the upper and lower side walls 3 and 4, is a hinge sleeve 8. Rigidly secured to the inner surface of the bottom 1, are a pair of lower longitudinal parallel spaced metal angles or guides 9, and also rigidly secured to the inner surface of the top 2, and directly above the lower angles or guides 9, are a pair of longitudinal parallel upper angles or guides 10, for a purpose hereinafter described. A back or rear screen wall 11, is provided to close one end of the trap cage. The back 11, has secured or formed on the side edges thereof pairs of sleeves 12, with the sleeves of each pair separated to permit the respective sleeves 8, of the collapsible sides 3 and 4, to register therewith when the rear wall is in position. Retaining pins or pintles 13, are removably projected through the registering sleeves 8 and 12, at the rear of the cage to hold the back 11, in position to serve as a brace and closure means for one end of the cage, and further act to hold the sides 3 and 4, from collapsing inwardly toward one another.

A front screen wall 14, is adapted to removably close the other open end of the cage. The front wall 14, is provided with an entrance opening 15, in the upper central portion thereof. Also secured on each of the side edges of the front wall 14, are pairs of sleeves 12, the sleeves of each pair separated from one another to permit the same to receive the respective sleeves 8, of the side walls 3 and 4, to register therewith, to permit retaining pins or pintles 13, to project therethrough to hold the front wall in position to close the front of the cage and also serve as a means for bracing the collapsible side walls to form a rigid trap construction.

Secured on the inner surface of the front screen wall 14, are a pair of parallel U-shaped or grooved guides 16, one on each side of the entrance opening 15, and extending from the top to the bottom of said front wall, to removably receive outwardly turned flanges 17, integrally formed on the front edges of a pair of smooth metal partitions or plates 18, which are disposed parallel to one another and bear against the flanges of the angle guides 9 and 10, to form a vestibule within the trap. Each of the partitions 18, is provided with an apertured integral arm or bracket 19, at the upper inner edge thereof for the purpose of removably receiving and supporting a rotatable transverse shaft or axle 20, upon which is secured the upper end of a hook shaped screen bait support 21, having the hooked portion thereof directed toward the rear of the trap. The width of the hanging bait support 21, is sufficient to hold the partitions 18, against movement toward one another.

As clearly shown in Fig. 4, the partitions 18, are provided with apertures near the front edge thereof slightly above and to the rear of the lower marginal edge forming the entrance opening 15. Rotatably and removably supported in said partition apertures are the ends of an axle or shaft 22, upon which is secured a trap door 23, of a width slightly less than that of the entrance opening 15. The trap door 23, has the outer or front weighted portion thereof projecting through the entrance opening 15, normally holding the inner or rear portion of the trap door in a horizontal position. The rear end of the trap door when in horizontal normal position extends to the rear edges of the partitions 18, and is disposed below the hanging bait support 21. The downward movement of the weighted outer portion of the trap door 23, is limited by means of a screen platform or stairs 24, of a width equal to that of the width of the trap, as shown in Fig. 2. Secured centrally to the rear edge of the upper step is a hooked hanger 25, adapted to removably engage over the lower marginal edge of the entrance opening 15, as clearly shown in Fig. 9, to hold the upper step in the plane of the lower edge of said entrance opening, and thereby enabling the step to serve as a stop for the downward movement of the outer weighted end of the trap door which normally rests thereon. Removably engaged over the central portion of the upper edge of the front wall 14, and directly above the entrance opening 15, is a hook support 26, integrally formed or rigidly secured upon the upper edge of a hood or shield embracing an inclined top 27, and triangular sides 28, the lower edges of which are inclined upwardly to join the lower front edge of the top 27, while the rear edges of said sides 28, are adapted, when the hood is in position, to engage against the front wall 14. It will be noted that the hood is open at its bottom and rear.

The operation is as follows:

As shown and described the rat or animal trap is collapsible and comprises a plurality of removably connected parts adapted to be readily packed together in compact form to permit the same to be stored away in a comparatively small space when the trap is not in use, as clearly shown in Figs. 5 and 6.

To assemble the trap the cage, comprising the hingedly connected bottom 1, top 2 and sides 3 and 4, is first set up and the rear wall 11, is then removably attached to either end of the cage by positioning the sleeves 12, of said rear wall to register with the respective sleeves 8, of the side walls 3 and 4, to permit the pintles 13, to be projected downwardly through the sleeves 8 and 12, at each rear corner of the trap to hold the cage against collapsing and also hold the rear wall in position to close one end of the cage. The pintles 13, as shown have the upper ends thereof hooked to prevent the same from passing all the way through said hinge sleeves, and if preferred said pintles may be provided with heads instead of hooks.

The front wall parts are next assembled before mounting in place, by inserting the flanges 17, of the partition walls 18, in the grooves of the guides 16. The trap door 23, is next placed in position between the partitions 18, by inserting the ends of the shaft 22, in the apertures of said partitions 18. The shaft 20, is then positioned with the ends thereof engaged in the apertures of the partition arms 19, thus holding the bait support 21, in position between the partitions 18. Said bait support and the trap door act to hold the partition walls separated from one another. The hood and the stairs are then removably hooked in their respective positions on the front wall 14, as shown in Figs. 1 and 2. The assembled front wall parts are placed in position by telescoping or sliding the partitions 18, into the cage between the flanges of the respective lower and upper guide angles 9 and 10, which act not only as guides but also serve as stops to prevent the partitions from moving away from one another. The front wall is positioned to close the other open end of the cage, and has the sleeves 12, thereof positioned to register with the respective sleeves 8 of the side walls 3 and 4, to permit retaining pintles 13, to be removably engaged through the hinge sleeves at the respective front corners of the trap. A rigid trap construction is thus formed and adapted to trap mice, rats or other animals depending upon the size of the trap. The walls of the trap as well as the stairs are preferably made of wire screening with the edges of said walls and stairs properly finished with metal edgings as shown to form a finished article.

With the trap assembled as described, any suitable kind of bait may be secured to the outer surface of the swinging bait support 21, and the trap may then be placed where rats are most liable to try and get the bait. It will be noted that the platform or stairs 24, are wider than the trap door 23, this arrangement affording a greater area for rats to reconnoiter, before attempting to enter the entrance opening 15, of the trap. The weighted outer end of the pivotally mounted trap door 23, normally rests flatly upon the top step and permits rats to move thereover without tending to frighten the same by moving. It is, of course, a well known trait in mice and rats to shy entering openings before thoroughly investigating the same. A rat scenting and locating the bait, after making the customary investigation of the trap by moving about on the stairs 24, and the outer end of the trap door 23, will finally endeavor to reach the bait by entering the trap vestibule through the entrance opening 15. The weight of the rat upon the inner end of the trap door will swing the inner end downwardly and simultaneously move the weighted outer end upwardly to contact the lower edges of the hood and temporarily close the entrance opening as shown in dotted lines in Fig. 4. The trap door 23, and the surfaces of the partitions 18, are purposely made smooth to prevent a rat being trapped from being able to retain a hold of any kind. It will thus be seen that the rat will slide from the tipped or inclined trap door into the trap, and the weighted trap door will automatically move into normal horizontal position due to the weight of the outer end of the door. If a rat upon entering the trap reaches for the bait the support 21 will move or swing inwardly away from the rat. Should the rat in an effort to save itself spring onto and cling to the bait support before sliding from the trap door into the cage, it cannot save itself for upon attempting to reach the entrance opening 15, by way of the trap door 23, which, of course has returned to horizontal normal position, the door will drop when the rat jumps or drops thereon to deposit the rat in the trap. To remove a rat from the trap, one of the rear corner pintles 13, may be removed, and the rear wall may be pivotally swung outwardly as a door.

From the construction of the device it will be noted that the front and rear walls may be removably secured to close either open end of the collapsible cage. It will of course be understood that the top and bottom may be made of collapsible sections instead of the sides, which in turn may be made of single wall sections, or if desired the top, bottom and side walls may each be constructed as a single section, and said sections pivotally or hingedly connected at the adjacent edges to permit the cage to collapse into a position wherein the top and one side will rest upon the other side and the bottom. It will further be understood that the hinge members of the cage walls may be provided with removable hinge bolts or pintles to permit the cage walls to be separated from one another for packing if desired.

I am aware that numerous other details of construction may be varied through a wide range without departing from the principles of this invention, and I therefore do not purpose limiting the patent granted otherwise than necessitated by the prior art.

I claim as my invention:

1. In a trap of the class described, a cage comprising a plurality of hingedly connected wall sections, trapping means telescoping into and removably closing one end of said cage, and door means for removably closing the other end of said cage and adapted to be swung into open position, said trapping means and door means also serving to brace said wall sections against collapsing to form a rigid trap.

2. In a trap of the class described, a collapsible cage, a wall removably secured to close and brace one end of said cage, and trapping means adapted to telescope into the other end of said cage to close said end and also serve as a brace for said cage.

3. In a trap of the class described, a collapsible cage, removable means for closing and bracing one end of said cage, removable trapping means telescoping into the other end of the cage to close and brace the same, and guide means in said cage for guiding and holding said trapping means in position.

4. In a trap of the class described, a collapsible cage, removable means for closing and bracing one end thereof, a removable member for closing and bracing the other end of said cage, said member having an entrance opening therein, and trapping means associated with said opening and removably secured on opposite sides of said member.

5. In a rat trap of the class described, a collapsible cage, guides therein, a removable member for closing and bracing one end of said cage, a removable means for closing and bracing the other end of said cage, said means having an entrance opening therein, partitions removably secured to said means between said cage guides, a removable bait support pivotally supported by and between said partitions, a removable trap door pivotally supported by and between said partitions and extending through said entrance opening, entrance means removably engaged with said removable closure means and adapted to afford access to said entrance opening and normally hold said trap door in horizontal position, and a hood removably engaged on said removable closure means to inclose a part of said entrance opening, said trap door adapted to be actuated by the weight of a rat to swing into a position to simultaneously contact said hood to close the entrance opening and deposit the rat within the trap.

6. In a trap of the class described, removably connected collapsible sections, guides on certain of said sections, and trapping means held in position by said guides acting to brace said collapsible sections to form a rigid trap.

7. In a rat trap of the class described, collapsible means having an entrance opening therein, guides in said means, trapping members within said means held in position by said guides, said trapping members serving to brace said collapsible means, and members removably connected to the outside of said collapsible means to co-act with said trapping members for trapping rats.

8. In a trap of the class described, a collapsible means having an entrance opening therein, removable means leading to said opening, partitions within said means acting to brace said collapsible means, a bait support movably supported by said partitions, a weighted trap door pivotally supported by said partitions and having the weighted end projecting outwardly through said opening to normally rest on said removable means, and a hood removably mounted on said collapsible means adapted to act as a stop for the weighted outer end of the trap door when the trap door is operated to trap a rat.

9. A trap embracing a casing made up of a plurality of members adapted to be readily disassociated from one another, one of said members having an entrance opening therein, partition braces removably disposed within said casing, a trap door pivotally supported thereon and projecting through said opening, and members removably attached on the exterior of said casing and associated with said opening to limit the swing of said trap door when actuated by a rat entering the trap.

In testimony whereof I have hereunto subscribed my name in the presence of two subscribing witnesses.

CHARLES W. BARTELS.

Witnesses:
CHARLES W. HILLS, Jr.,
FRED E. PAESLER.

Copies of this patent may be obtained for five cents each, by addressing the "Commissioner of Patents, Washington, D. C."